United States Patent
Gey et al.

(10) Patent No.: US 9,440,294 B2
(45) Date of Patent: Sep. 13, 2016

(54) MODULAR CUTTING INSERT AND METHOD OF MAKING SAME

(71) Applicant: Kennametal Inc., Latrobe, PA (US)

(72) Inventors: Christoph Gey, Greensburg, PA (US); Pankaj K. Mehrotra, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 253 days.

(21) Appl. No.: 14/188,457

(22) Filed: Feb. 24, 2014

(65) Prior Publication Data
US 2014/0169894 A1    Jun. 19, 2014

Related U.S. Application Data

(63) Continuation of application No. 13/362,131, filed on Jan. 31, 2012, now Pat. No. 8,696,264.

(51) Int. Cl.
| | |
|---|---|
| *B23B 27/14* | (2006.01) |
| *B23B 27/16* | (2006.01) |
| *B28B 1/00* | (2006.01) |
| *B23P 15/28* | (2006.01) |

(52) U.S. Cl.
CPC ......... *B23B 27/1611* (2013.01); *B23B 27/145* (2013.01); *B23B 27/148* (2013.01); *B23P 15/28* (2013.01); *B28B 1/002* (2013.01); *B23B 2200/3681* (2013.01); *Y10T 29/49826* (2015.01); *Y10T 407/23* (2015.01)

(58) Field of Classification Search
CPC ............... B23B 2200/3681; B23B 27/145; B23B 27/148; B23B 27/1611; Y10T 407/23; Y10T 407/235; Y10T 407/24; Y10T 407/245

USPC ................................. 407/113, 114, 115, 116
See application file for complete search history.

(56) References Cited

U.S. PATENT DOCUMENTS

| | | | |
|---|---|---|---|
| 502,780 A | 8/1893 | Smith | |
| 3,040,605 A | 6/1962 | Andreasson | |
| 3,085,453 A | 4/1963 | Mossberg | |
| 3,142,110 A | 7/1964 | Hertel | |
| 3,254,392 A * | 6/1966 | Novkov | B23B 27/04 407/113 |
| 3,422,706 A | 1/1969 | Lunsford | |
| 3,504,575 A | 4/1970 | Masao Makino | |

(Continued)

FOREIGN PATENT DOCUMENTS

| | | |
|---|---|---|
| CN | 1042855 A | 6/1990 |
| CN | 1231627 A | 10/1999 |

(Continued)

OTHER PUBLICATIONS

Feb. 10, 2016 Non-Final Office Action—U.S. Appl. No. 13/754,426.

(Continued)

*Primary Examiner* — Daniel Howell
*Assistant Examiner* — Nicole N Ramos
(74) *Attorney, Agent, or Firm* — Matthew S. Bedsole

(57) ABSTRACT

A cutting insert for use on a tool body includes a first member formed in a predetermined shape and a second member formed separate from the first member in a second predetermined shape and coupled to the first member. At least one of the first member or the second member comprise a number of cutting portions adapted to perform cutting operations on a workpiece.

16 Claims, 4 Drawing Sheets

(56) References Cited

U.S. PATENT DOCUMENTS

| | | | |
|---|---|---|---|
| 3,745,623 A | 7/1973 | Wentorf | |
| 3,831,428 A | 8/1974 | Wentorf | |
| 4,205,425 A | 6/1980 | Shinozaki | |
| 4,212,569 A | 7/1980 | Andersson et al. | |
| 4,214,845 A | 7/1980 | Mori | |
| 4,294,566 A | 10/1981 | Boone | |
| 4,315,706 A * | 2/1982 | Erkfritz | B23B 27/1611 407/101 |
| 4,629,373 A * | 12/1986 | Hall | B23B 27/146 175/434 |
| 4,636,116 A | 1/1987 | Shikata | |
| 4,674,059 A | 6/1987 | Schrieber | |
| 4,813,823 A | 3/1989 | Bieneck | |
| 4,876,148 A * | 10/1989 | Virkar | B32B 18/00 428/372 |
| 4,881,431 A | 11/1989 | Bieneck | |
| 5,020,780 A | 6/1991 | Woodings | |
| 5,046,899 A | 9/1991 | Nishi | |
| 5,110,349 A | 5/1992 | Westergren et al. | |
| 5,115,697 A | 5/1992 | Rodriguez et al. | |
| 5,275,633 A | 1/1994 | Johansson et al. | |
| 5,277,435 A | 1/1994 | Kramer | |
| 5,351,772 A * | 10/1994 | Smith | E21B 10/5735 175/428 |
| 5,564,511 A * | 10/1996 | Frushour | B23B 27/146 175/431 |
| 5,582,494 A | 12/1996 | Cook | |
| 5,598,751 A | 2/1997 | Ochayon et al. | |
| 5,707,185 A | 1/1998 | Mizutani | |
| 5,899,642 A | 5/1999 | Berglow | |
| 5,947,660 A | 9/1999 | Karlsson et al. | |
| 5,980,166 A | 11/1999 | Ogura | |
| 6,082,935 A | 7/2000 | Hori | |
| 6,187,068 B1 * | 2/2001 | Frushour | B01J 3/062 407/118 |
| 6,227,319 B1 * | 5/2001 | Radford | E21B 10/5735 175/431 |
| 6,551,035 B1 | 4/2003 | Bruhn | |
| 6,663,326 B1 | 12/2003 | Hiroyasu | |
| 6,736,226 B2 | 5/2004 | Broom | |
| 7,357,604 B2 | 4/2008 | Craig | |
| 7,985,470 B2 | 7/2011 | Kuroda et al. | |
| 8,007,922 B2 | 8/2011 | Mirchandani et al. | |
| 8,696,264 B2 | 4/2014 | Gey et al. | |
| 2001/0031177 A1 | 10/2001 | Nagaya | |
| 2006/0159529 A1 | 7/2006 | Haenle | |
| 2007/0292219 A1 | 12/2007 | Craig | |
| 2008/0152441 A1 * | 6/2008 | Andersson | B23B 27/065 407/103 |
| 2008/0260479 A1 | 10/2008 | Kammermeier | |
| 2008/0304923 A1 | 12/2008 | Lehto | |
| 2009/0028741 A1 | 1/2009 | Dahlund et al. | |
| 2009/0035074 A1 * | 2/2009 | Craig | B23B 27/1629 407/40 |
| 2009/0142150 A1 | 6/2009 | Chu | |
| 2010/0021253 A1 | 1/2010 | Frejd | |
| 2010/0172704 A1 | 7/2010 | Nelson | |
| 2010/0183386 A1 | 7/2010 | Heinloth et al. | |
| 2010/0215446 A1 | 8/2010 | Wandeback | |
| 2010/0272526 A1 | 10/2010 | Dufour et al. | |
| 2010/0290845 A1 | 11/2010 | Shimoda | |

FOREIGN PATENT DOCUMENTS

| | | | |
|---|---|---|---|
| CN | 1379704 A | 11/2002 | |
| CN | 102006959 A | 4/2011 | |
| DE | 202011050277 U1 | 7/2012 | |
| JP | 52114188 A | 9/1977 | |
| JP | 57201103 A | 12/1982 | |
| JP | 58109204 A | 6/1983 | |
| JP | 62039101 A | 2/1987 | |
| JP | 01115505 A | 5/1989 | |
| JP | 05285708 A | 11/1993 | |
| JP | 2001138110 A | 5/2001 | |
| JP | 2002011612 A | 1/2002 | |
| JP | 2005132672 A | 5/2005 | |
| JP | 2005279826 A | 10/2005 | |
| JP | 2008213077 A | 9/2008 | |
| JP | 2010253632 A | 11/2010 | |
| WO | WO 2004098818 A2 * | 11/2004 | B22F 7/062 |

OTHER PUBLICATIONS

Mar. 2, 2016 First Office Action—CN Application 201310022152.7.
Apr. 27, 2015 Non-Final Office Action—20130223943.
Nov. 2, 2015 Final Office Action—20130223943.
U.S. Pat. No. 20130223943, Jan. 22, 2016 Advisory Action (PTOL-303) 1 U.S. Pat. No. 20130223943.
Apr. 5, 2016—First Office Action for Chinese Application 201310023399.0 and English translation.

* cited by examiner

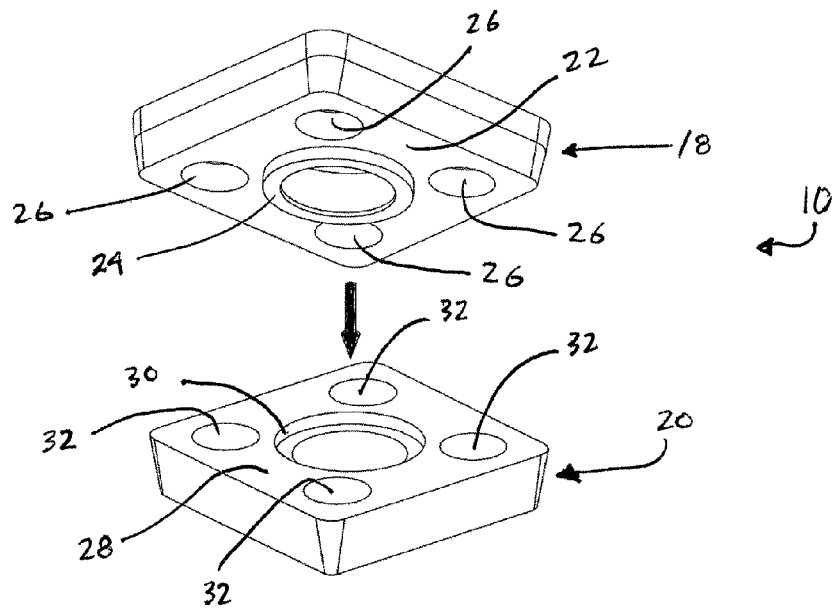
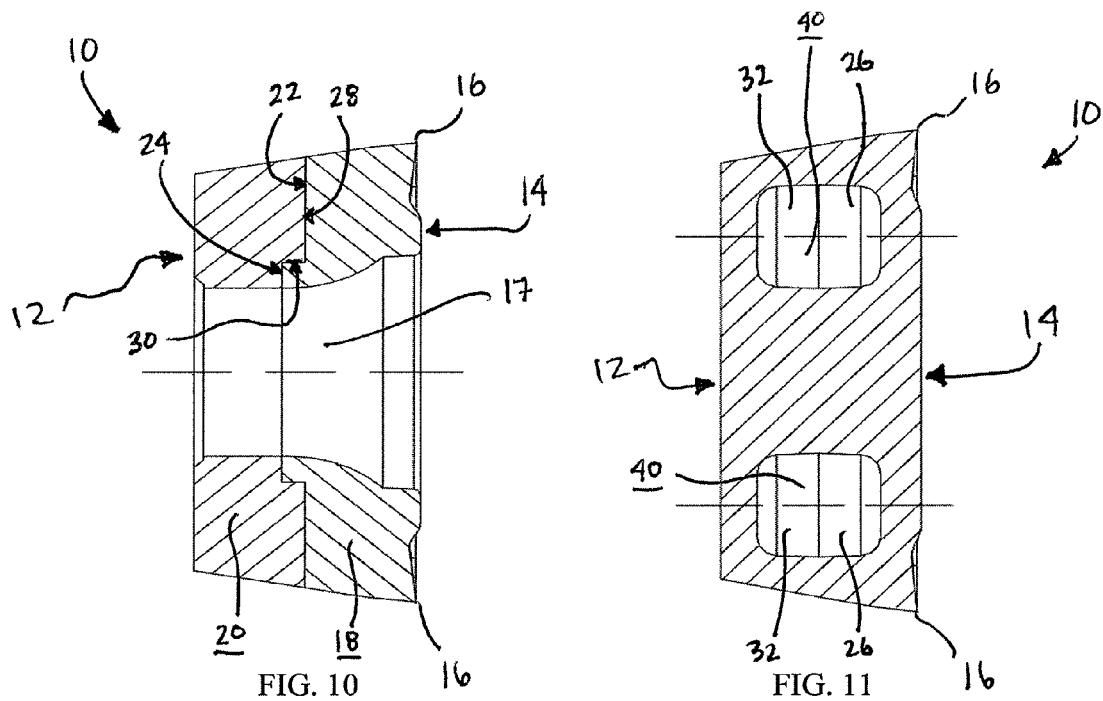
FIG. 9
FIG. 10
FIG. 11

MODULAR CUTTING INSERT AND METHOD OF MAKING SAME

CROSS-REFERENCE TO RELATED APPLICATION

This application is a continuation application of U.S. patent application Ser. No. 13/362,131 entitled "Modular Cutting Insert and Method of Making Same" filed Jan. 31, 2012, the entire disclosure of which is hereby incorporated by reference.

BACKGROUND

1. Field of the Invention

The invention relates generally to cutting inserts for use with cutting tools and, more particularly, to cutting inserts formed from more than one component. The invention further relates to a method for making such cutting inserts.

2. Background Information

Rotary cutting tools, such as, for example, without limitation, drills, reamers, or endmills are commonly formed wholly from hardened tool steels, from hardened tool steels coated with a secondary, hardened material, or formed from hardened tool steels provided with replaceable cutting inserts formed from other hardened materials such as, for example, ceramic, cemented carbide, and cermet. The use of such replaceable cutting inserts generally is more cost-effective in comparison to tools formed wholly from hardened materials as the use of replaceable cutting inserts allows for a particular tool body to be reused for an extended period of time as only the inserts need to be replaced in order to essentially have a new cutting tool. However, the materials from which such replaceable inserts are formed is generally quite high which generally also makes the cost of such replaceable inserts quite high. Thus the cost of such inserts may cancel out the potential cost savings of such tools in small volume operations.

There is, therefore, a need for improved cutting inserts and methods of forming the same.

SUMMARY OF THE INVENTION

Deficiencies in the prior art are addressed by embodiments of the invention which are directed to an improved cutting insert and a method of making an improved cutting insert.

As one aspect of the invention, a cutting insert for use on a tool body is provided. The cutting insert comprises a first member formed in a predetermined shape and a second member formed separate from the first member in a second predetermined shape and coupled to the first member, wherein one of the first member or the second member comprise a number of cutting portions adapted to perform cutting operations on a workpiece.

The first member may be formed from a first material and the second member may be formed from a second material different from the first material.

The first member may be formed from a first material and the second member may be formed from the first material.

The first member may comprise a first mating portion, the second member may comprise a second mating portion in engagement with and coupled to the first mating portion, and at least one of the first mating portion and the second mating portion may comprise a first number of recessed portions formed therein.

Each recessed portion of the first number of recessed portions may form a portion of a sealed chamber within the cutting insert.

The other one of the first mating portion and the second mating portion may comprise a second number of recessed portions formed therein.

Each recessed portion of the first number of recessed portions and each recessed portion of the second number of recessed portions may be disposed in the respective mating portions in a manner such that each recessed portion of the first number of recessed portions is generally aligned with a corresponding recessed portion of the second number of recessed portions.

Each recessed portion of the first number of recessed portions and each recessed portion of the second number of recessed portions may form a number of sealed chambers within the cutting insert.

Each recessed portion of the first number of recessed portions and each recessed portion of the second number of recessed portions may be disposed in the respective mating portions in a manner such that each recessed portion of the first number of recessed portions is generally not aligned with a corresponding recessed portion of the second number of recessed portions.

The first member may comprise a number of first locating features, the second member may comprises a number of second locating features, and the number of first locating features and the number of second locating features may cooperatively engage each other in a manner that aligns the first member and the second member in a predetermined manner.

The first member may comprise a first aperture, the second member may comprise a second aperture, and the first aperture and the second aperture may be generally aligned and structured to receive a mechanism for coupling the cutting insert to the tool body.

As another aspect of the invention a cutting insert for use on a tool body is provided. The cutting insert comprises a body portion including a portion having a number of cutting regions and a number of sealed chambers disposed within the body portion.

The body portion may comprise a plurality of separately pre-formed members permanently coupled together to form the body portion.

As yet another aspect of the invention, a method of forming a cutting insert is provided. The method comprises forming a first member in a first predetermined shape, the first member including a number of cutting portions, each cutting portion adapted to perform cutting operations on a workpiece; forming a second member in a second predetermined shape; and coupling the first member and the second member together to form a single cutting insert.

At least one of forming a first member and forming a second member may comprise forming via a pressing or injection molding process.

Coupling the first member and the second member together may comprise sintering the first member and the second member to form a single member.

Forming a first member may comprise forming a number of first locating features on the first member, forming a second member may comprise forming a number of second locating features on the second member, and coupling the first member and the second member together to form a single cutting insert may comprise cooperatively engaging the number of first locating features with the number of second locating features.

At least one of forming a first member in a first predetermined shape and forming a second member in a second predetermined shape may comprise forming a number of recesses in the respective member, and coupling the first member and the second member together to form a single cutting insert may comprise forming a number of sealed chambers formed in-part by the number of recesses.

Forming a first member in a first predetermined shape may comprise forming the first member from a powdered tungsten carbide material and forming the second member in a second predetermined shape may comprise forming the second member at least in-part from powdered tungsten carbide material scrapped from formation of the first member.

These and other objects, features, and characteristics of the present invention, as well as the functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which:

FIG. 9 is a view of the top and bottom portions of the cutting insert of FIGS. 1 and 2 in alignment prior to being coupled;

FIG. 10 is a cross-sectional view of the cutting insert of FIGS. 1 and 2 taken along line A-A of FIG. 1; and FIG. 11 is a cross-sectional view of the cutting insert of FIGS. 1 and 2 taken along line B-B of FIG. 1.

DESCRIPTION OF THE PREFERRED EMBODIMENTS

Figure 1:
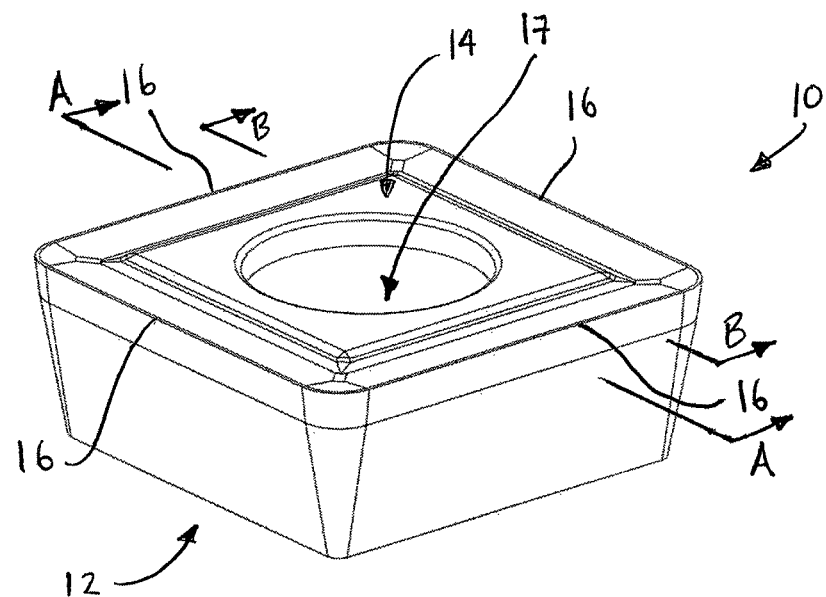
FIG. 1 is an isometric view of a cutting insert in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e. one or any quantity greater than one).

Figure 2:
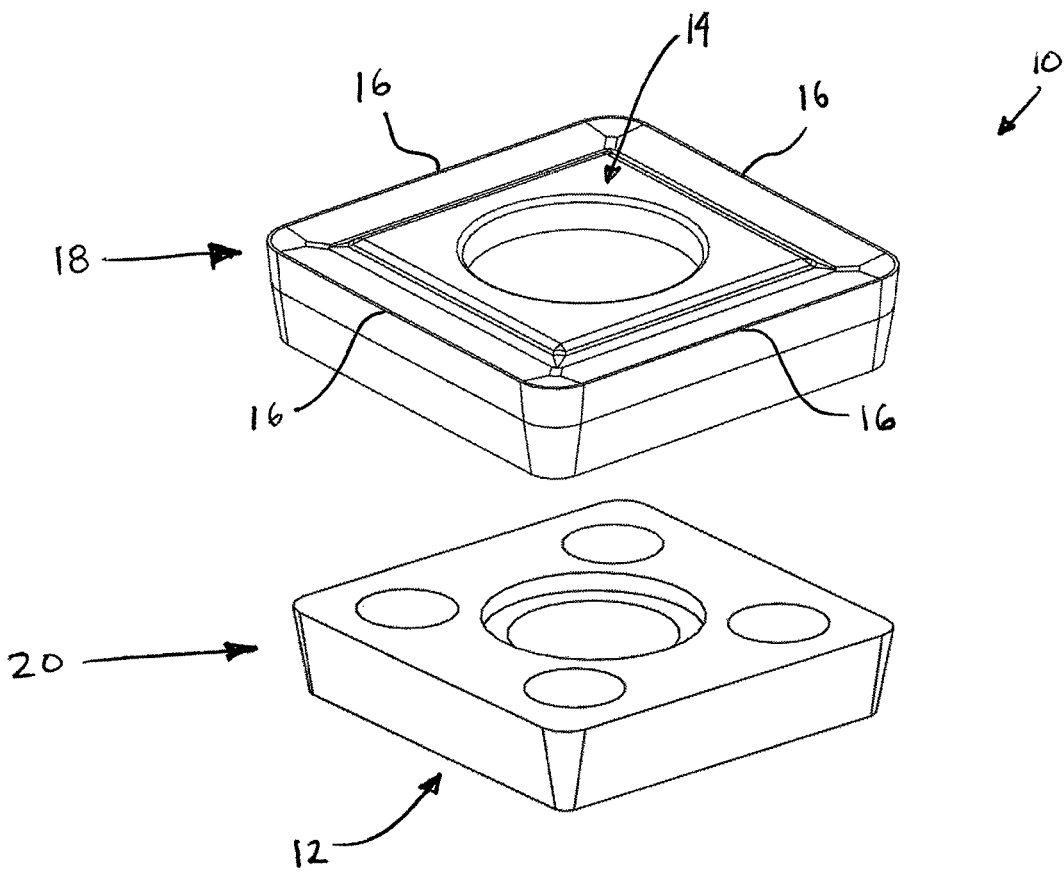
FIG. 2 is an exploded isometric view of the cutting insert of FIG. 1.

FIGS. 1 and 2 depict an example cutting insert 10 in accordance with a non-limiting embodiment of the present invention, for use with a tool body (not shown) in conducting rotary cutting operations on a workpiece (not shown) when the tool body to which cutting insert 10 is coupled is rotated about a central longitudinal axis. As common with conventional cutting inserts, cutting insert 10 includes a base portion 12 and a top portion 14 bounded by a number of cutting regions 16, each cutting region 16 having a geometry suitable for performing cutting operations on a workpiece. While four cutting regions 16 are shown in the exemplary embodiment, it is to be appreciated that one or more of the quantity, shape, size or other attribute may be varied without varying from the scope of the present invention.

Cutting insert 10 may also include an aperture 17 for receiving a coupling mechanism, such as a retaining or clamping screw (not shown) for coupling cutting insert 10 to a tool body. It is to be appreciated that the present invention contemplates any suitable coupling means may be employed to couple cutting insert 10 to a tool body, hence one or more of the size, shape, or location of aperture 17 may be varied without varying from the scope of the present invention. Additionally cutting insert 10 may be formed without aperture 17 without varying from the scope of the present invention.

As shown in the exploded view of FIG. 2, cutting insert 10 is formed from a first member 18 and a second member 20 which are initially separately formed in desired predetermined shapes such as by, for example, without limitation, pressing or injection molding. Once formed, first member 18 and second member 20 are then coupled together to form cutting insert 10. In other embodiments, one of the first or second members may be sintered prior to coupling with the other member, which may then be green formed around the already sintered member. Such sintering of one member is generally preferable in embodiments when the materials from which the two members are separately formed have very different sintering temperatures.

Although the exemplary embodiment described in detail herein is formed from two members, it is to be appreciated that that the present invention contemplates that more than two members may also be used to form a cutting insert. As an example, without limitation, a double-sided cutting insert (e.g., one two members cutting portions) formed in accordance with the present invention may be formed having a third member disposed between members having cutting portions.

In an exemplary embodiment, first member 18 was formed from a tungsten carbide material (WC-10% Co) having a hardness of 91 HRA, and second member 20 was formed from scrapped carbide powder, thus reducing the amount of waste material, and thus the overall cost of producing such inserts. However, it is to be appreciated that first and second members 18 and 20 may be formed from other suitable materials without varying from the scope of the present invention.

In the exemplary embodiment shown in FIG. 1, first member 18 and second member 20 are brought together and then permanently coupled via a sintering process. It is to be appreciated, however, that other coupling processes may be employed without varying from the scope of the present invention.

Having thus described the overall layout of cutting insert 10, further details of first member 18 will now be described in conjunction with FIGS. 3-5 which show side, bottom, and lower isometric views, respectively, of first member 18.

First member 18 includes top portion 14 which, as previously discussed, includes a number of cutting regions 16. First member 18 further includes a first mating portion 22 disposed opposite top portion 14. In the exemplary embodiment depicted, first mating portion includes a locating feature 24 embodied as a projecting portion extending from first mating portion. As will be discussed in greater detail below, when first member 18 and second member 20 are brought together, locating feature 24 cooperatively engages a portion of second member 20 in a manner that generally aligns first member 18 and second member 20 in a predetermined manner. It is to be appreciated that locating feature 24 depicted in the FIGS. is provided for example purposes only and that one or more of the size, shape, height or quantity of such locating feature 24 may be varied without varying from the scope of the present invention. Although generally desirable, first member 18 may also be formed without any locating feature(s).

Figures 3, 4:
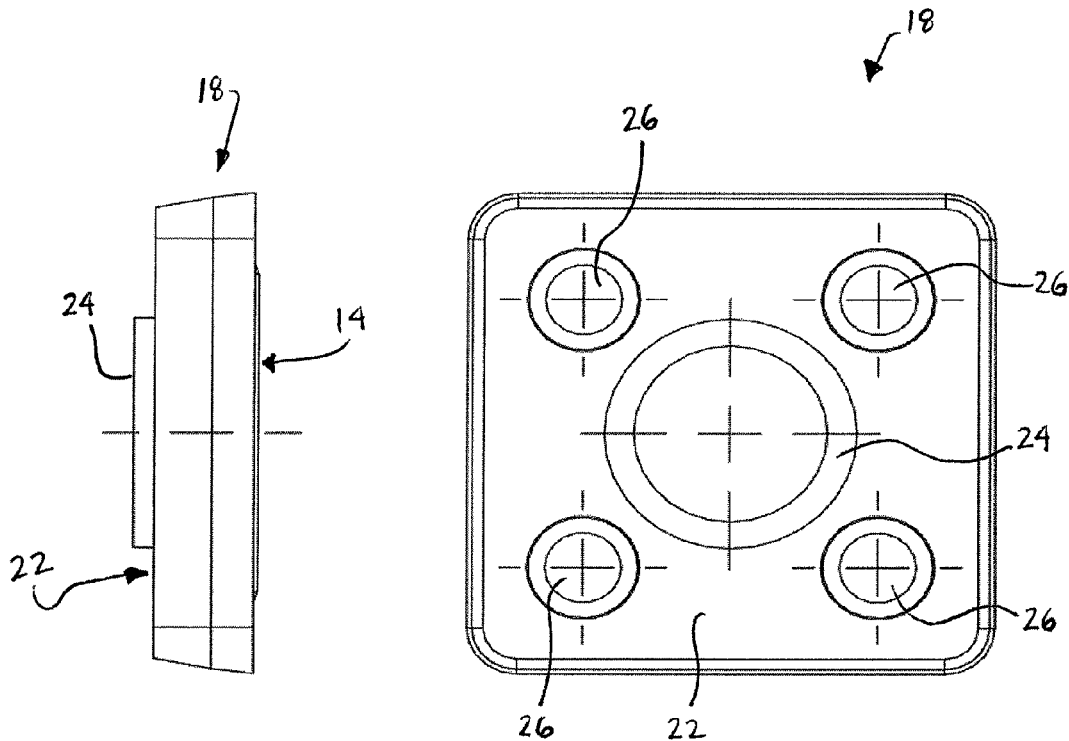
FIG. 3 is a side view of the top member of the cutting insert of FIGS. 1 and 2.
FIG. 4 is a bottom view of the top member of the cutting insert of FIGS. 1 and 2.
Figure 5:
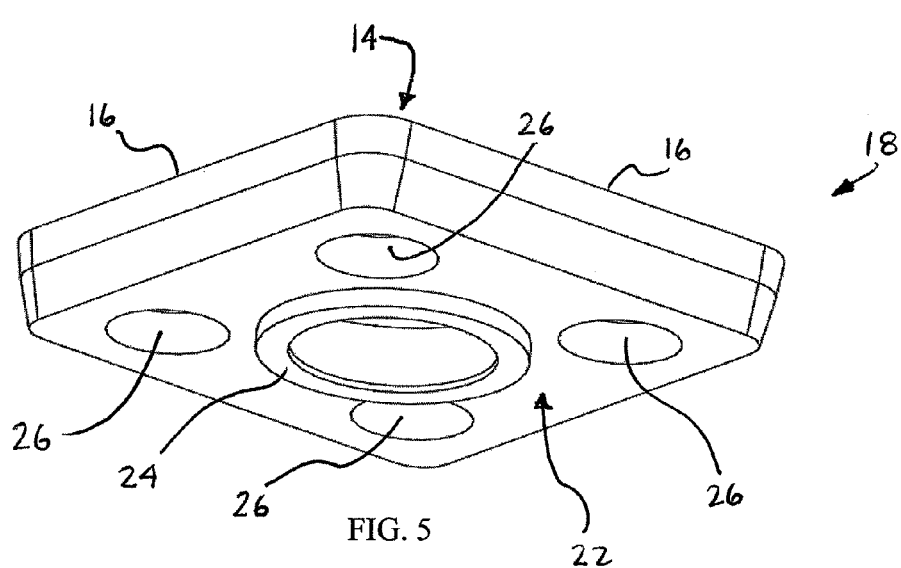
FIG. 5 is an isometric view of the top member of the cutting insert of FIGS. 1 and 2 showing the bottom portion of the top member.

Continuing to refer to the exemplary embodiment of FIGS. 4 and 5, first mating portion 22 may also include a number of recessed portions 26 formed therein which generally extend from first mating portion 22 toward top portion 14. The benefit of such recessed portions 26 will be discussed further below. Although four generally circular recessed portions 26 are shown in the exemplary embodiment depicted, it is to be appreciated that one or more of the size, shape, depth or quantity of such recessed portions 26 may be varied without varying from the scope of the present invention. It is also to be appreciated that first member 18 may also be formed without any recessed portions 26 without varying from the scope of the present invention.

Figures 6, 7:
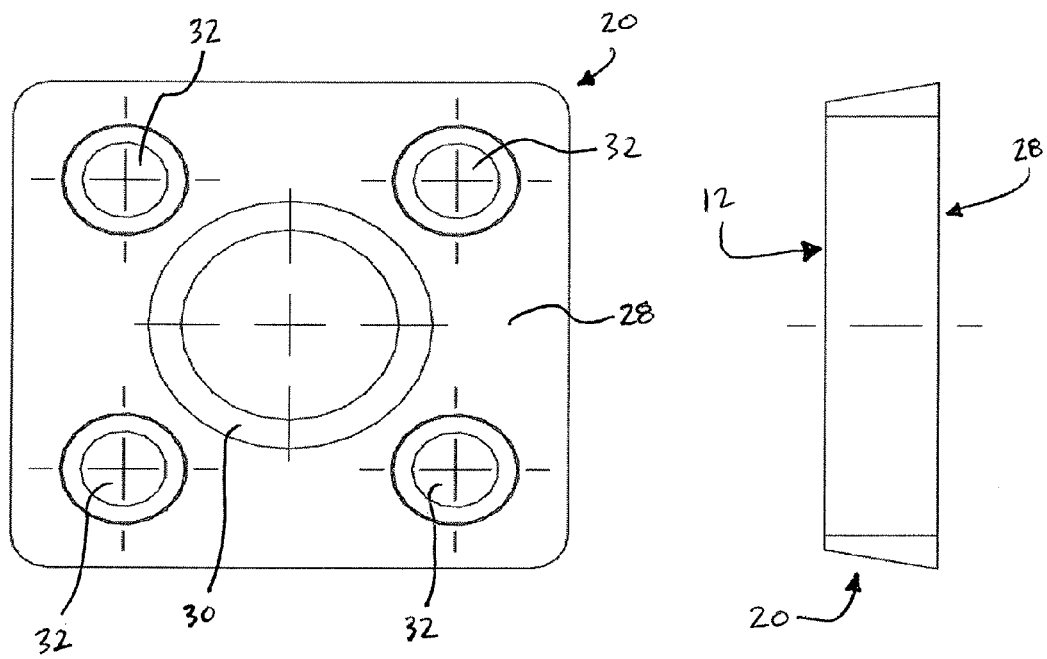
FIG. 6 is top view of the bottom member of the cutting insert of FIGS. 1 and 2.
FIG. 7 is a side view of the bottom member of the cutting insert of FIGS. 1 and 2.
Figure 8:
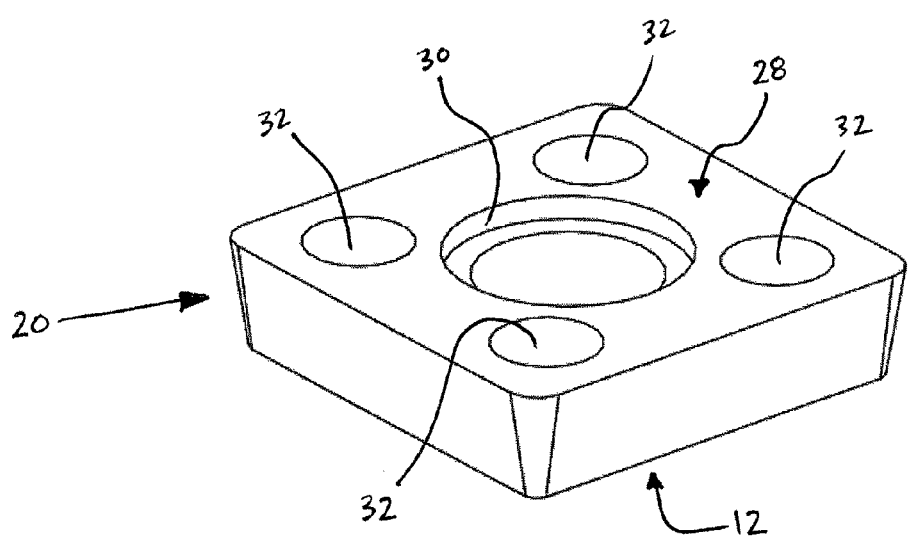
FIG. 8 is an isometric view of the bottom member of the cutting insert of FIGS. 1 and 2 showing the top portion of the bottom member.

Referring to FIGS. 6-8, which depict top, side and isometric views, respectively, of second member 20, second member 20 includes a second mating portion 28 disposed opposite base portion 12. In the exemplary embodiment depicted, second mating portion 28 includes a locating feature 30 in the form of a central circular groove portion which is sized and positioned to cooperatively engage the corresponding locating feature 24 (i.e., the projecting portion) of first mating portion 22 of first member 18 in a manner that aligns first member 18 and second member 20 in a predetermined manner when first mating portion 22 and second mating portion 28 are brought together in a manner as shown by the arrow in FIG. 9. It is to be appreciated that like locating feature 24 of first member 18, one or more of the size, shape, height, or quantity of locating feature 30 of second member 20 may be varied to coincide with locating feature 24 without varying from the scope of the present invention. Also, although generally desirable, second member 20 may also be formed without any locating features.

Continuing to refer to FIGS. 6 and 8, second mating portion 28 may also include a second number of recessed portions 32 formed therein which generally extend from second mating portion 28 toward base portion 12. The benefit of such recessed portions will be discussed further below. Although four generally circular recessed portions 32 are shown in the exemplary embodiment depicted, it is to be appreciated that one or more of the size, shape, depth or quantity of such recessed portions 32 may be varied without varying from the scope of the present invention. It is also to be appreciated that second member 20 may also be formed without any recessed portions 32 without varying from the scope of the present invention.

Having thus described the components of cutting inserts and optional features thereof, features of the finished cutting insert 10 and benefits thereof will now be discussed in reference to FIGS. 9-11.

FIG. 9 shows the basic alignment of first member 18 and second member 20 in forming cutting insert 10. Alignment of first member 18 and second member 20 is simplified by the inclusion of first and second locating features 24 and 30 which cooperatively engage each other in a manner that generally aligns first and second members 18 and 20. The cross-sectional view of FIG. 10 generally shows such cooperative engagement and alignment.

As shown in the cross-sectional view of FIG. 11, each of the first number of recessed portions 26 and each of the second number of recessed portions 32 may align in such a manner so as to form a number of sealed chambers 40 within cutting insert 10. It is to be appreciated that recessed portions 26 and 32 may also be misaligned or not aligned whatsoever without varying from the scope of the present invention.

By selectively providing such sealed chambers 40 within cutting insert 10, less material is required to produce cutting insert 10 as compared to a cutting insert with similar exterior dimensions. By requiring less material, the material cost of such an insert having interior chambers or voids is lessened in comparison to solid inserts of comparable size. By carefully placing such chambers in areas of low internal stress, overall strength and durability of the cutting insert is not compromised. Additionally, by making such chambers sealed, the risk of potential entrapment of cutting materials or fluids is of no concern.

In addition to the benefits of being able to reduce the amount of material needed to form a particular insert, it is to be appreciated that the present invention also provides the benefit of being able to reduce the amount of hardened material needed to produce a particular insert by allowing the portion of the insert spaced away from the cutting surfaces or edges (e.g., second member 20) to be formed from a different, less expensive material. Such arrangement using different material for different portions may be used without any internal chambers or with internal chambers to maximize potential material cost savings.

In addition to the embodiments described herein, it is to be appreciated that the concepts described herein may also be used to form modular inserts having non-sealed passages formed therein. Such non-sealed passages may be used to provide coolant fluid or cooling gases to one or more of the number of cutting edges provided on an insert.

While specific embodiments of the invention have been described in detail herein, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cutting insert for use on a tool body, the cutting insert comprising:
    a first member having a first mating portion, wherein the first mating portion includes a first recess portion formed therein; and a second member formed separate from the first member and coupled to the first member, the second member having a second mating portion in engagement with the first mating portion, wherein the second mating portion includes a second recess portion formed therein that is generally aligned with the first recess portion, wherein one of the first member or the second member comprise a cutting portion adapted to perform cutting operations on a workpiece, and wherein the first member includes a first locating feature and the second member includes a second locating feature configured to cooperatively engage the first locating feature in a manner that aligns the first member and the second member in a predetermined manner.

2. The cutting insert of claim 1, wherein the first recessed portion of the first member and the second recessed portion of the second member form a sealed chamber within the cutting insert.

3. The cutting insert of claim 2, wherein the first recessed portion of the first member and the second recessed portion of the second member are axially aligned.

4. The cutting insert of claim 3, wherein the first recessed portion of the first member does not extend through the first member to a top portion.

5. The cutting insert of claim 4, wherein the second recessed portion of the second member does not extend through the second member to a bottom portion.

6. The cutting insert of claim 1, wherein the first mating portion includes additional first recess portions formed therein and the second mating portion includes additional second recess portions formed therein that are generally aligned with the additional first recess portions.

7. The cutting insert of claim 6, wherein the additional first recessed portions of the first member and the additional second recessed portions of the second member form additional sealed chambers within the cutting insert.

8. The cutting insert of claim 1, wherein the first member is formed from a first material and the second member is formed from a second material different from the first material.

9. The cutting insert of claim 1, wherein the first member is formed from a first material and the second member is formed from the first material.

10. The cutting insert of claim 1, wherein the first locating feature includes a projection extending from the first mating portion.

11. The cutting insert of claim 10, wherein the second locating feature includes a groove formed in the first mating portion.

12. The cutting insert of claim 11, wherein the first member includes a first aperture and the second member includes a second aperture, the first aperture and the second aperture being generally aligned and configured to receive a mechanism for coupling the cutting insert to the tool body.

13. The cutting insert of claim 12, wherein the first aperture of the first member and the second aperture of the second member are axially aligned.

14. A method of forming a cutting insert for performing cutting operations on a workpiece, the method comprising:
forming a first member having a first mating portion with a first recess portion formed therein;
forming a second member separate from the first member, the second member having a second mating portion with a second recess portion formed;
forming a cutting portion on one of the first member or the second member;
engaging the first mating portion with the second portion;
aligning the first recess portion with the second recess portion; and
coupling the first member and the second member together to form a single cutting insert,
wherein at least one of forming a first member and forming a second member comprise forming via a pressing or injection molding process.

15. The method of claim 14, wherein coupling the first member and the second member together comprises sintering the first member and the second member to form a single member.

16. A method of forming a cutting insert for performing cutting operations on a workpiece, the method comprising:
forming a first member having a first mating portion with a first recess portion formed therein;
forming a second member separate from the first member, the second member having a second mating portion with a second recess portion formed;
forming a cutting portion on one of the first member or the second member;
engaging the first mating portion with the second portion;
aligning the first recess portion with the second recess portion; and
coupling the first member and the second member together to form a single cutting insert,
forming the first member in a first predetermined shape from a powdered tungsten carbide material; and
forming the second member in a second predetermined shape at least in-part from a scrapped powdered tungsten carbide material.

* * * * *